(12) United States Patent
Zhu et al.

(10) Patent No.: US 12,435,980 B1
(45) Date of Patent: Oct. 7, 2025

(54) WHEEL-WING DUAL-DRIVE HIGH-MOBILITY CLIMBING ROBOT

(71) Applicant: GUANGDONG UNIVERSITY OF TECHNOLOGY, Guangdong (CN)

(72) Inventors: Haifei Zhu, Guangdong (CN); Jingyi Mo, Guangdong (CN); Lide Dun, Guangdong (CN); Yongzhong Bu, Guangdong (CN)

(73) Assignee: GUANGDONG UNIVERSITY OF TECHNOLOGY, Guangdong (CN)

( * ) Notice: Subject to any disclaimer, the term of this patent is extended or adjusted under 35 U.S.C. 154(b) by 0 days.

(21) Appl. No.: 19/220,113

(22) Filed: May 28, 2025

(30) Foreign Application Priority Data

Feb. 28, 2025 (CN) .......................... 202510230946.5

(51) Int. Cl.
*G06F 17/00* (2019.01)
*B60B 19/00* (2006.01)
*B62D 57/024* (2006.01)
*G01C 21/16* (2006.01)

(52) U.S. Cl.
CPC ........ *G01C 21/1656* (2020.08); *B60B 19/006* (2013.01); *B62D 57/024* (2013.01)

(58) Field of Classification Search
CPC .. G01C 21/1656; B60B 19/006; B62D 57/024
USPC .......................................................... 701/22
See application file for complete search history.

(56) References Cited

U.S. PATENT DOCUMENTS

2024/0051154 A1* 2/2024 Duperret ................ B25J 13/088

FOREIGN PATENT DOCUMENTS

| CN | 1219457 A | * | 6/1999 | | |
|---|---|---|---|---|---|
| CN | 101544249 | | 9/2009 | | |
| CN | 107416061 | | 12/2017 | | |
| CN | 110949558 | | 4/2020 | | |
| CN | 110949558 A | * | 4/2020 | ........... | B62D 57/024 |
| CN | 117429526 | | 1/2024 | | |
| CN | 117429526 A | * | 1/2024 | ........... | B62D 57/024 |
| CN | 117429526 B | * | 2/2024 | ........... | B62D 57/024 |
| CN | 117961921 | | 5/2024 | | |
| CN | 117961921 A | * | 5/2024 | ............ | B25J 9/1602 |

(Continued)

OTHER PUBLICATIONS

Current Status and Trends of Wall-Climbing Robots Research (Year: 2025).*

*Primary Examiner* — Ronnie M Mancho
(74) *Attorney, Agent, or Firm* — JCIPRNET (57) ABSTRACT

The present invention relates to the technical field of climbing robots, and more specifically, to a wheel-wing dual-drive high-mobility climbing robot, including a base, a first drive portion, a second drive portion, an inertial measurement unit, a Hall sensor, a depth camera, and a control module. The control module is configured to integrate data from the depth camera and the inertial measurement unit to determine whether the climbing robot has a trend to cross an edge-corner structure, and when the trend exists, select whether to use a crossing strategy of the second drive portion based on data from the Hall sensor. In this solution, when it is difficult for the climbing robot to cross an edge-corner structure using a wheel-driven mode alone, a ducted fan is activated to form a wheel-wing dual-drive mode, thereby compensating for shortcomings of single-mode wheel drive, enhancing mobility of the climbing robot.

10 Claims, 6 Drawing Sheets

(56) References Cited

FOREIGN PATENT DOCUMENTS

| | | | | |
|---|---|---|---|---|
| CN | 119705659 | A | * | 3/2025 |
| CN | 119705659 | B | * | 4/2025 |
| JP | 2007283419 | A | * | 11/2007 |
| JP | 2021178562 | A | * | 11/2021 |
| JP | 7491526 | B2 | * | 5/2024 |

* cited by examiner

WHEEL-WING DUAL-DRIVE HIGH-MOBILITY CLIMBING ROBOT

CROSS-REFERENCE TO RELATED APPLICATION

This application claims the priority benefit of China application serial no. 202510230946.5, filed on Feb. 28, 2025. The entirety of the above-mentioned patent application is hereby incorporated by reference herein and made a part of this specification.

TECHNICAL FIELD

The present invention relates to the technical field of climbing robots, and more specifically, to a wheel-wing dual-drive high-mobility climbing robot.

BACKGROUND

A wheeled magnetic adsorption climbing robot achieves stable contact and crawling on a steel structure using wheels, a magnetic adsorption structure, and other auxiliary mechanisms. Existing wheeled magnetic adsorption climbing robots can cross structures such as concave angles, convex angles, steel plate edges, and flange edges, but minor manual remote operation errors easily cause the climbing robot to fall. In addition, existing wheeled magnetic adsorption climbing robots cannot pass over structures that are difficult to be crossed, such as crossing a vertical steel plate from top downwards.

To reduce the difficulty of manual remote operation, an existing high-mobility wheeled climbing robot is provided, including a base, a magnetic wheel module, a tail wheel module, an inner angle crossing auxiliary mechanism, and a motion auxiliary wheel. During unfolding of the tail wheel module, the climbing robot is stably supported when crawling on a plane and crossing structures such as an outer angle or a steel plate edge. The inner angle crossing auxiliary mechanism enables the climbing robot to cross an inner angle structure. The motion auxiliary wheel can serve, together with the tail wheel module, as a support wheel system for the movement of the climbing robot, allowing the climbing robot to move on planes at any angles without the base rolling over and without hindering the climbing robot from crossing various structures. Through the coordinated operation of the inner angle crossing auxiliary mechanism, the motion auxiliary mechanism, and the tail wheel module, the climbing robot can move on planes at any angles and cross various complex three-dimensional structures. However, in practical application, it has been found that an operator struggles to precisely control the motion speed of the climbing robot at which it smoothly crosses a complex edge-corner structure. When the motion speed of the climbing robot is too fast, the excessive centrifugal force easily causes the climbing robot to peel off. When the motion speed of the climbing robot is too slow, insufficient power prevents the climbing robot from completing the crossing action. Therefore, wheeled magnetic adsorption climbing robots require more flexible, simple, and effective technical solutions to cross difficult structures.

SUMMARY

An objective of the present invention is to provide a wheel-wing dual-drive high-mobility climbing robot, overcoming the shortcomings in the prior art where an operator struggles to precisely control a motion speed of a climbing robot at which it smoothly crosses a complex edge-corner structure. The climbing robot in this solution can reduce the requirements for the motion speed when crossing a complex edge-corner structure, such that the operator smoothly operates the climbing robot to cross the complex edge-corner structure.

To address the above technical problems, the technical solution adopted by the present invention is:

A wheel-wing dual-drive high-mobility climbing robot is provided, which includes a base, a first drive portion, a second drive portion, an inertial measurement unit, a Hall sensor, a depth camera, and a control module, where the first drive portion includes magnetic wheel modules rotatably mounted on two sides of the base;

the second drive portion includes a ducted fan mounted on the base and an electronic speed controller capable of controlling a rotation speed and a rotation direction of the ducted fan;

the inertial measurement unit is configured to acquire current motion state information of the climbing robot and an included angle between the normal vector of a current motion plane of the climbing robot and a gravity direction, the motion state information including a motion direction of the climbing robot and a motion angular speed of the climbing robot during crossing over an edge-corner structure;

the depth camera is configured to acquire external environment information, determine whether an edge-corner structure exists, and to acquire pose information of the edge-corner structure in combination with data from the inertial measurement unit;

the Hall sensor is configured to acquire type information of the edge-corner structure;

the control module is configured to determine, based on the pose information of the edge-corner structure, pose information of the climbing robot, and the motion state information of the climbing robot, whether a trend to cross the edge-corner structure exists for the climbing robot, and select a crossing strategy based on the type information of the edge-corner structure when the trend to cross the edge-corner structure exists; and the crossing strategy includes a first crossing strategy and a second crossing strategy, the first crossing strategy includes letting the first drive portion be in operation and letting the second drive portion be not in operation, the second crossing strategy includes letting the first drive portion and the second drive portion simultaneously being in operation, and during execution of the second crossing strategy, the control module controls the rotation speed and the rotation direction of the ducted fan via the electronic speed controller.

When the wheel-wing dual-drive high-mobility climbing robot of the present invention crosses a complex structured edge-corner structure, a magnetic wheel module provides adsorption force and traction capacity for the climbing robot, laying a power foundation for the climbing robot to smoothly cross the edge-corner structure. The inertial measurement unit can obtain the current motion state information of the climbing robot based on the gravity direction and obtaining the included angle between the normal vector of the current motion plane of the climbing robot and the gravity direction based on a geometric relationship between the climbing robot and the motion plane. The Hall sensor can determine the magnetic field strength by measuring changes in Hall voltage, and by assessing the magnetic field strength, determine whether the climbing robot is in an edge-corner structure region and obtaining the type of the edge-corner structure. The depth camera can acquire external environment information, determine whether the motion plane has an edge-corner structure, and obtain position information of the edge-corner structure. After the climbing robot acquires edge-corner structure information, it can establish a coordinate system to acquire a distance between the edge-corner structure and the climbing robot.

When it is detected that the climbing robot has difficulty smoothly crossing an edge-corner structure, the control module first determines the type of the edge-corner structure to be crossed. Then, by monitoring the operating state of the climbing robot, the control module determines whether the climbing robot has a too fast motion speed, causing excessive centrifugal force during turning that could drive the climbing robot to peel off, or whether the climbing robot has a too slow motion speed, causing insufficient crossing power that could prevent the climbing robot from successfully completing the crossing action. When it is detected that the climbing robot has a too fast motion speed, causing excessive centrifugal force during turning that could drive the climbing robot to peel off, the control module controls the ducted fan in the second drive portion to rotate in reverse. When the ducted fan rotates in reverse, a thrust opposite to the forward direction of the climbing robot is generated. The thrust generated by the ducted fan, which is opposite to the forward direction of the climbing robot, offsets part of the centrifugal force generated when the climbing robot crosses the edge-corner structure, ensuring that the climbing robot does not peel off due to excessive centrifugal force when crossing the edge-corner structure and can smoothly cross a complex structured edge-corner structure. When it is detected that the climbing robot has a too slow motion speed, causing insufficient crossing power that could prevent the climbing robot from successfully completing the crossing action, the control module controls the ducted fan in the second drive portion to rotate forward. When the ducted fan rotates forward, a thrust in the same direction as the forward direction of the climbing robot generated, further increasing the climbing robot's power during crossing over the edge-corner structure, thus enabling the climbing robot to have sufficient power to complete the crossing over the edge-corner structure.

The climbing robot in this solution adopts a wheel-wing dual-drive mode. When it is difficult to precisely control the motion speed of the climbing robot in wheel-drive mode at which it smoothly crosses a complex structured edge-corner structure, the wing-drive of the ducted fan compensates for the shortcomings of the single wheel-drive mode, enhancing the mobility of the climbing robot. This also significantly reduces operational complexity in remotely controlling the climbing robot to cross a edge-corner structure that is difficult to be crossed, such that the operator smoothly controls the climbing robot to cross the complex structured edge-corner structure.

Further, the second drive portion also includes a ducted fan fixing bracket. The ducted fan fixing bracket is detachably mounted on the top of the base. The ducted fan is fixedly connected to the ducted fan fixing bracket, and the electronic speed controller is mounted on the base. The ducted fan fixing bracket is arc-shaped to fit with the base. After the ducted fan fixing bracket is connected to the base, the ducted fan and the base are respectively located on two sides of the arc-shaped ducted fan fixing bracket. The detachable connection between the ducted fan and the base is achieved through the ducted fan fixing bracket, allowing the model of the ducted fan on the base to be changed based on the different requirements of the climbing robot in various working environments. Additionally, when the ducted fan is not needed, the second drive portion can be detached from the base, improving the endurance of the climbing robot, flexibility and safety during planar motion, and enabling the climbing robot to gain stronger environmental adaptability and work capability. The ducted fan fixing bracket is arc-shaped to fit with the base, further increasing the contact area between the ducted fan fixing bracket and the base, thus improving the stability of the ducted fan on the base. The electronic speed controller is primarily responsible for controlling the rotation speed of the ducted fan, thereby controlling the magnitude of the force provided by the ducted fan to the climbing robot.

Further, the control module determines whether the trend to cross the edge-corner structure exists for the climbing robot according to the following steps:

determining whether a distance between the climbing robot and an edge line of the edge-corner structure is less than a preset value; if the distance is not less than the preset value, continuing detection; if the distance is less than the preset value, determining whether an included angle between a current motion direction of the climbing robot and the edge line of the edge-corner structure is in a preset range; if the included angle is not in the preset range, continuing detection; and if the included angle is in the preset range, determining the trend to cross the edge-corner structure exists. The preset range of the included angle between the forward direction of the climbing robot and the edge line of the edge-corner structure is typically 80° to 100°.

Further, when the control module selects the crossing strategy, the control module selects the crossing strategy based on the following conditions:

$$\begin{cases} F_6(\beta) - \dfrac{mgR^2 Vh}{mR^2 + I} + F_7 = \\ F_6(\beta) - \dfrac{2mgR^2\left[\cos\left(\alpha - \pi - \dfrac{\beta}{2}\right) + \cos\left(\pi - \alpha - \dfrac{\pi}{2}\right)\right]}{mR^2 + I} - mg \cdot \cos\left(\alpha - \pi - \dfrac{\beta}{2}\right) > 0 \\ F_8(\beta) - \dfrac{2mgR^2 Vh}{mR^2 + I} + F_7 = \\ F_8(\beta) - \dfrac{2mgR^2\left[\cos\left(\alpha - \dfrac{\pi}{2} - \beta\right) + \cos\left(\pi - \alpha - \dfrac{\pi}{2}\right)\right]}{mR^2 + I} - mg \cdot \cos(\alpha - \pi - \beta) > 0 \end{cases}$$

here $F_6$ is a magnetic force acting on the climbing robot at an intermediate position of the edge-corner structure during crossing; $F_7$ is a component force of gravity in a centripetal direction; $F_8$ is a magnetic force acting on the climbing robot located on a second plane immediately after completing crossing motion; Vh is a projection of a distance of a mass center of the climbing robot from an initial position to two key positions in a gravity direction, one key position being the intermediate position of the edge-corner structure where the climbing robot is located during crossing, and the other key position being a position of the second plane where the climbing robot is located immediately after completing the crossing motion; α is an included angle between the second plane and the gravity direction; β is an included angle between two planes of the edge-corner structure; R is an overall mass center height of the climbing robot; m is a total mass of the climbing robot; and I is a rotation inertia of the climbing robot about a Y-axis of a coordinate system.

The angle of the edge-corner structure that the climbing robot needs to cross during actual crawling varies between 0° and 360°, and the included angle between the motion direction of the climbing robot and the gravity direction also changes. To determine whether the climbing robot needs to use the ducted fan when crossing different edge-corner structures, a unified standard must be established to assess whether the climbing robot can complete the crossing motion without using the ducted fan. In the analysis process, two key positions are primarily analyzed: the first one is the sharp angle position of the edge-corner structure where the climbing robot is located during crossing, where the magnetic force on the climbing robot is minimal; the second one is the position on the second plane immediately after the climbing robot completes the crossing motion from top downwards, where the kinetic energy of the climbing robot is maximized and the centrifugal force subjected by the climbing robot is greatest. At these two positions, the climbing robot is most likely to peel off or fail to cross. After the two positions are analyzed, the above conditions can be obtained. The first crossing strategy is selected if the above conditions are satisfied; and the second crossing strategy is selected if the above conditions are not satisfied.

Further, when it is determined that the ducted fan is to be used for crossing the edge-corner structure, the thrust of the ducted fan needs to be reasonably controlled to keep the kinetic energy of the climbing robot within a reasonable range, preventing the climbing robot from peeling off due to excessive centrifugal force or failing to complete the crossing action due to insufficient centrifugal force. Therefore, during execution of the second crossing strategy, a minimum thrust value of the ducted fan is a minimum reverse thrust required when the climbing robot uses the ducted fan for reverse pushing; and a maximum thrust value of the ducted fan is a maximum forward thrust required when the climbing robot uses the ducted fan for forward pushing.

The minimum reverse thrust required when the climbing robot uses the ducted fan for reverse pushing should satisfy the following conditions:

$$\begin{cases} F_6(\beta) - \dfrac{2mgR^2\left[\cos\left(\alpha - \pi - \dfrac{\beta}{2}\right) + \cos\left(\pi - \alpha - \dfrac{\pi}{2}\right)\right]}{mR^2 + I} - mg\cdot\cos\left(\alpha - \pi - \dfrac{\beta}{2}\right) + \\ \qquad \dfrac{F_9\cdot\sin\theta\cdot\left(\dfrac{\pi-\beta}{2}\right)\cdot L}{R} + F_8\cdot\cos\theta > 0 \\ F_8(\beta) - \dfrac{2mgR^2\left[\cos\left(\alpha - \dfrac{\pi}{2} - \beta\right) + \cos\left(\pi - \alpha - \dfrac{\pi}{2}\right)\right]}{mR^2 + I} - mg\cdot\cos\left(\alpha - \dfrac{\pi}{2} - \beta\right) + \\ \qquad \dfrac{F_9\cdot\sin\theta\cdot(\pi-\beta)\cdot L}{R} + F_8\cdot\cos\theta > 0 \end{cases}$$

where $F_6$ is a magnetic force acting on the climbing robot at an intermediate position of the edge-corner structure during crossing; $F_8$ is a magnetic force acting on the climbing robot located on a second plane immediately after completing crossing motion; $F_9$ is the minimum reverse thrust of the ducted fan; R is an overall mass center height of the climbing robot; m is a total mass of the climbing robot; θ is an included angle between a central axis of the ducted fan in an XOZ plane of a coordinate system of the climbing robot and a Z-axis; α is an included angle between the second plane and a gravity direction; β is an included angle between two planes of the edge-corner structure; I is a rotation inertia of the climbing robot about a Y-axis of the coordinate system; and L is a length between a center of the ducted fan and a contact point between the climbing robot and the edge-corner structure.

The maximum forward thrust required when the climbing robot uses the ducted fan for forward pushing should satisfy the following condition:

$$F_8(\beta) - \dfrac{F_{10}\cdot\sin\theta\dfrac{\pi-\beta}{2}\cdot L}{R} - \dfrac{2mgR^2\left[\cos\left(\alpha - \dfrac{\pi}{2} - \beta\right) + \cos\left(\pi - \alpha - \dfrac{\pi}{2}\right)\right]}{mR^2 + I} - mg\cdot\cos\left(\alpha - \dfrac{\pi}{2} - \beta\right) - F_{10}\cdot\cos\theta > 0,$$

where $F_{10}$ is the maximum forward thrust of the ducted fan.

Further, parameters of the ducted fan are determined according to the following steps:

step 1: selecting a ducted fan that has sufficient thrust margin and satisfies mounting conditions, based on intrinsic parameters and application scenarios of the climbing robot;

step 2: based on an actual motion condition of the climbing robot, obtaining a type of an edge-corner structure that is to be crossed by the climbing robot requiring assistance from the ducted fan, acquiring a most-difficult-to-cross scenario, analyzing a crossing process of the climbing robot, and acquiring required thrust magnitude conditions that the ducted fan provides;

step 3: obtaining a mounting angle θ of the ducted fan based on parameters of the climbing robot required when the climbing robot goes through the most-difficult-to-cross scenario, a mass of the second drive portion, and a thrust of the ducted fan required by the climbing robot; and step 4: obtaining a length L between a center of the ducted fan and a contact point between the climbing robot and the edge-corner structure based on the parameters of the climbing robot required when the climbing robot goes through the most-difficult-to-cross scenario, the mass of the second drive portion, the thrust of the ducted fan required by the climbing robot, and the mounting angle θ of the ducted fan.

The climbing robot obtained by designing the ducted fan of the climbing robot according to the above steps, after mounting of the wing-driven ducted fan, not only reduces the operational difficulty of the operator in scenarios requiring assistance from the ducted fan for crossing, but also does not increase the operational difficulty of the operator in scenarios where the climbing robot crosses without requiring assistance from the ducted fan.

Preferably, the mounting conditions of the ducted fan include:
  determining a range of a mounting height of the ducted fan on the climbing robot and a maximum volume of the ducted fan based on the intrinsic parameters and the application scenarios of the climbing robot; and
  determining an allowable maximum value of a mass of the second drive portion based on the intrinsic parameters of the climbing robot and a range of a mass center mounting height of the ducted fan, where the mass center mounting height of the ducted fan is less than the mounting height of the ducted fan on the climbing robot.

Preferably, a relationship between the mass $m_2$ of the second drive portion and an overall mass center height R of the climbing robot after the ducted fan is mounted should satisfy the following conditions:

$$R = \frac{r \cdot m_1 + (r+h)m_2}{m}$$

$$m = m_1 + m_2$$

$$F_1 - \frac{\sqrt{2}}{2}(m_1+m_2)g - \frac{(m_1+m_2)^2 R\left[V_0^2 - 2gR\left(1 - \frac{\sqrt{2}}{2}\right)\right]}{(m_1+m_2)R^2 + I} > 0,$$

where R is the overall mass center height of the climbing robot after the ducted fan is mounted; r is a mass center height of the climbing robot before the second drive portion is mounted; h is a mass center height of the ducted fan; m is a total mass of the climbing robot; $F_1$ is a radial magnetic force magnitude of the magnetic wheel module when the climbing robot is at 45° during external right-angle crossing, $m_1$ is a mass of the robot; $m_2$ is the mass of the second drive portion; and $V_0$ is an initial speed of the climbing robot.

If the climbing robot can smoothly cross the outer right angle and steel plate structure from the bottom surface to the vertical surface, it can smoothly cross other edge-corner structures without the assistance of the ducted fan. By analyzing the crossing process of the climbing robot in this scenario, it can be obtained the relationship between the mass $m_2$ of the second drive portion and the mass center height h of the ducted fan should satisfy the above conditions.

Preferably, in step 2, crossing edge-corner structures requiring assistance from the ducted fan includes the following types: crossing the bottom of vertical and inclined steel plates from top downwards, climbing over horizontal and inclined steel plates from bottom upwards, crossing horizontal steel plates from top downwards, continuously crossing right-angle edges, crossing flange edges upwards from a vertical surface, and crossing other acute angle structures between right angles and steel plates. By analysis, it can be obtained that the most-difficult-to-cross scenarios are: crossing the bottom of a vertical steel plate from top downwards, climbing over a horizontal steel plate from bottom upwards, and crossing a horizontal steel plate from top downwards. An inclined steel plate refers to a steel plate with an inclined plane. Similarly, a horizontal steel plate refers to a steel plate with a plane parallel to a horizontal plane, and a vertical steel plate refers to a steel plate with a plane parallel to a vertical plane.

When the climbing robot crosses from top downwards to the bottom of a horizontal steel plate, the force conditions of the climbing robot should satisfy the following:

$$F_2 - mg + F_3 \cdot \cos\theta - \frac{mV_2^2}{R} > 0,$$

where $F_2$ is a magnetic force acting on the climbing robot at the bottom of the horizontal steel plate, $F_3$ is a maximum reverse thrust that is provided by the ducted fan and acts on the climbing robot when the climbing robot crosses the horizontal steel plate and the vertical steel plate from top downwards to bottoms of the horizontal steel plate and the vertical steel plate, and that is opposite to the motion speed direction of the climbing robot, and $V_2$ is a speed of the climbing robot at the bottoms of the horizontal steel plate and the vertical steel plate.

When the climbing robot crosses from top downwards to the bottom of a vertical steel plate, the force conditions of the climbing robot should satisfy the following:

$$F_4 - mg + F_3 \cdot \cos\theta - \frac{mV_2^2}{R} > 0,$$

where $F_4$ is a magnetic force acting on the climbing robot at the bottom of the vertical steel plate.

In addition, to ensure that the climbing robot does not peel off when the reverse thrust of the ducted fan acts on the climbing robot at the bottom of the vertical steel plate causing the speed of the climbing robot to drop to 0, the force conditions of the climbing robot should satisfy the following:

$$F_2 + F_3 \cdot \cos\theta - mg > 0.$$

When the climbing robot climbs from bottom upwards over a horizontal steel plate and is located on a side surface of the horizontal steel plate, the climbing robot needs to overcome the maximum gravitational moment. The component force of the forward thrust provided by the ducted fan in the same direction as the motion speed direction of the climbing robot in the radial direction of the magnetic wheel easily causes the climbing robot to peel off. Therefore, the force conditions of the climbing robot satisfy the following:

$$F_5 \cdot \cos\theta < F_2$$

where $F_5$ is a forward thrust that is provided by the ducted fan and acts on the climbing robot when the climbing robot crosses the horizontal steel plate from bottom upwards to reach the side surface of the horizontal steel plate, and that is in the same direction as the motion direction of the climbing robot.

Preferably, in step 3, by analyzing the force conditions in the most-difficult-to-cross scenario where the climbing robot needs the assistance from the ducted fan to cross an edge-corner structure, it can be obtained that the mounting angle θ of the ducted fan should satisfy the following conditions:

$$\begin{cases} \theta = 90°, F_2 > \mathrm{mg} \\ \theta = \arccos\left(\dfrac{\mathrm{mg} - F_2}{F_3}\right) - \theta_K, F_2 < \mathrm{mg} \end{cases},$$

where θ is the mounting angle of the ducted fan, that is, an included angle between a central axis of the ducted fan in an XOZ plane of the coordinate system of the climbing robot and a Z-axis; $F_2$ is a magnetic force acting on the climbing robot at a bottom of a horizontal steel plate; $F_3$ is a maximum thrust that is provided by the ducted fan and acts on the climbing robot when the climbing robot crosses the horizontal steel plate and the vertical steel plate from top downwards to reach bottoms of the horizontal steel plate and the vertical steel plate, and that is opposite to a motion direction of the climbing robot; m is a total mass of the climbing robot; and $\theta_K$ is a safety margin angle.

Preferably, in step 4, by analyzing the force conditions in the most-difficult-to-cross scenario where the climbing robot needs the assistance from the ducted fan to cross an edge-corner structure, it can be obtained the height L from the center of the air duct of the ducted fan to the contact point between the climbing robot and the edge-corner structure to be crossed should satisfy the following equations:

$$\begin{cases} F_4 + F_3 \cdot \cos\theta - \dfrac{2m^2 gR - F_3 \cdot \sin\theta \cdot \pi \cdot L \cdot m \cdot R}{mR^2 + I} - \mathrm{mg} > 0 \\ F_2 + F_3 \cdot \cos\theta - \dfrac{4m^2 gR - F_3 \cdot \sin\theta \cdot \pi \cdot L \cdot m \cdot R}{mR^2 + I} - \mathrm{mg} > 0, \\ \dfrac{1}{2}\pi \cdot F_5 \sin\theta \cdot L - mgR > 0 \end{cases}$$

where $F_4$ is a magnetic force acting on the climbing robot at a bottom of the vertical steel plate; $F_5$ is a forward thrust that is provided by the ducted fan and acts on the climbing robot when the climbing robot crosses the horizontal steel plate from bottom upwards and reaches a side surface of the horizontal steel plate, and that is in a same direction as the motion direction of the climbing robot; L is the mounting height of the ducted fan, that is, a length between a center of the ducted fan and a contact point between the climbing robot and the edge-corner structure to be crossed; and I is a rotation inertia of the climbing robot about a Y-axis of the coordinate system.

Compared with the prior art, the beneficial effects of the present invention are:

The wheel-wing dual-drive high-mobility climbing robot of the present invention adopts a wheel-wing dual-drive mode. When it is difficult to precisely control the motion speed of the climbing robot in wheel-drive mode at which it smoothly crosses a complex structured edge-corner structure, the wing-drive of the ducted fan compensates for the shortcomings of the single wheel-drive mode, reducing requirements for the motion speed of the climbing robot when it crosses the complex structured edge-corner structure, such that the operator smoothly controls the climbing robot to cross the complex structured edge-corner structure.

After mounting parameters are determined such as the volume of the ducted fan, the wheel-wing dual-drive high-mobility climbing robot of the present invention not only reduces the operational difficulty of the operator in scenarios requiring assistance of the ducted fan for crossing, but also does not increase the operational difficulty of the operator in scenarios where the climbing robot crosses without requiring assistance of the ducted fan.

When the wheel-wing dual-drive high-mobility climbing robot of the present invention crosses the edge-corner structure, by analyzing the motion state of the climbing robot, the motion state of the climbing robot can be adjusted through forward or reverse thrust from the ducted fan module when the climbing robot is at risk of peeling off or unable to complete the crossing action, enabling the climbing robot to smoothly and safely complete the crossing motion.

Numeral references in the figure: 1. base; 2. magnetic wheel module; 3. tail wheel module; 31. tail wheel swing rod; 32. tail wheel roller; 4. transition roller; 5. motion auxiliary wheel; 6. sensing module; 61. depth camera; 62. Hall sensor; 7. control module; 8. battery module; 81. battery one; 82. battery two; 9. second drive portion; 91. ducted fan fixing bracket; 92. ducted fan; and 93. electronic speed controller.

DETAILED DESCRIPTION OF EMBODIMENTS

The following provides further description of the present invention with reference to specific implementations. The drawings are used for illustrative purposes only, representing schematic diagrams rather than physical drawings, and should not be construed as limitations on this patent. To better illustrate the embodiments of the present invention, certain components in the drawings may be omitted, enlarged, or reduced, and do not represent the actual product dimensions. For those skilled in the art, it is understandable that certain well-known structures and their descriptions in the drawings may be omitted.

In the drawings of the embodiments of the present invention, identical or similar reference numerals correspond to identical or similar components. In the description of the present invention, it should be understood that terms such as "up," "down," "left," and "right" indicating orientation or positional relationships are based on the orientation or positional relationships shown in the drawings. These terms are used only to facilitate the description of the present invention and simplify the description, and do not indicate or imply that the referred device or element must have a specific orientation, be constructed, or operate in a specific orientation. Therefore, the terms describing positional relationships in the drawings are used for illustrative purposes only and should not be construed as limitations on this patent. For those of ordinary skill in the art, the specific meanings of the above terms can be understood based on specific circumstances.

Embodiment 1

Figure 1:
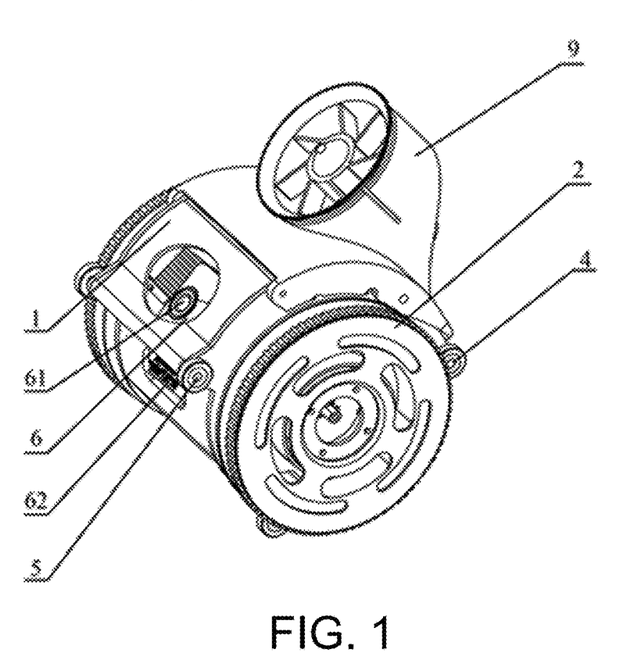
FIG. 1 is a schematic structural diagram of a wheel-wing dual-drive high-mobility climbing robot according to the present invention.
Figure 2:
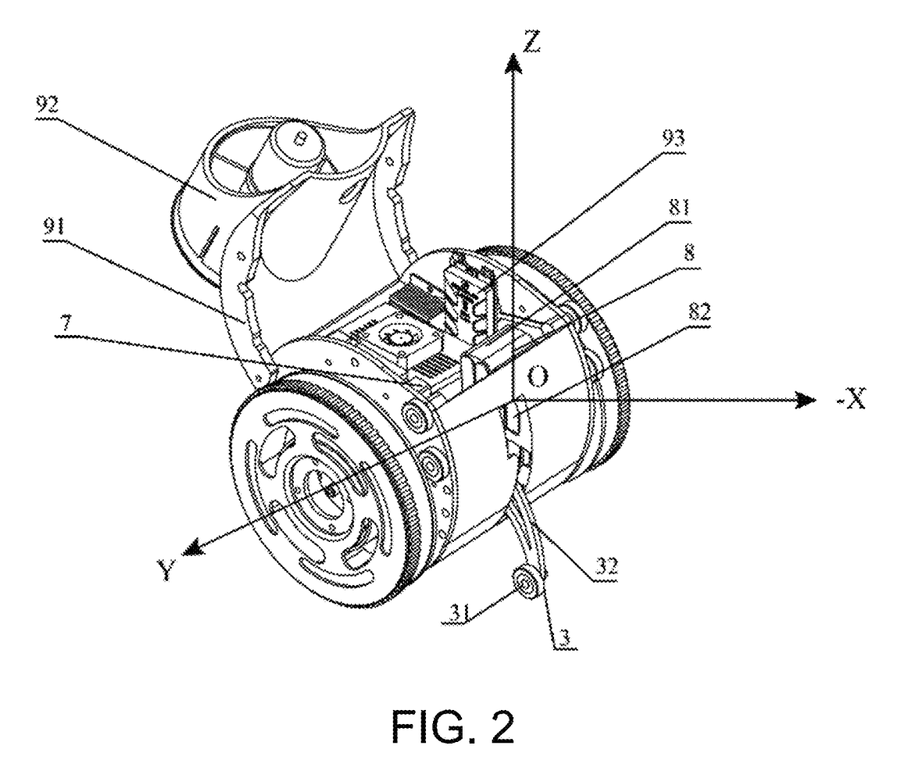
FIG. 2 is a schematic state diagram of a ducted fan module and a tail wheel module of the wheel-wing dual-drive high-mobility climbing robot being simultaneously deployed according to the present invention.

Embodiment 1 is a first embodiment of a wheel-wing dual-drive high-mobility climbing robot, as shown in FIGS. 1 and 2, including a base 1, a first drive portion, a second drive portion 9, and a battery module 8, a control module 7, and a sensing module 6 mounted on the base 1. The first drive portion includes magnetic wheel modules 2 rotatably mounted on two sides of the base 1. The second drive portion 9 includes a ducted fan 92 mounted on the top of the base 1 and an electronic speed controller 93 capable of controlling the rotation speed of the air duct of the ducted fan 92. The battery module 8 and the control module 7 are electrically connected to the first drive portion, the second drive portion 9, and the sensing module 6. The sensing module 6 includes an inertial measurement unit and a Hall sensor 62 mounted in an inner cavity of the base. When the climbing robot struggles to cross an edge-corner structure using the first drive portion, the ducted fan 92 in the second drive portion begins to operate.

Specifically, the second drive portion 9 further includes a ducted fan fixing bracket 91. The ducted fan 92 is connected to the base 1 through the ducted fan fixing bracket 91. The ducted fan 92 is fixedly connected to the ducted fan fixing bracket 91, and the ducted fan fixing bracket 91 is detachably connected to the base 1. The ducted fan fixing bracket 91 is arc-shaped to fit the base 1. After the ducted fan fixing bracket 91 is connected to the base 1, the ducted fan 92 and the base 1 are respectively located on two sides of the arc-shaped ducted fan fixing bracket 91.

Specifically, the battery module 8 includes a first battery 81 and a second battery 82. The first battery 81 is connected to the first drive portion and the sensing module 6, and the electronic speed controller 93 and the ducted fan 92 are connected to the second battery 82.

Specifically, the first drive portion also includes a tail wheel module 3 movably mounted on the rear side of the base 1 and capable of moving relative to the base 1 into the inner cavity of the base 1, an inner angle crossing auxiliary mechanism mounted on the rear side of the base 1, and a motion auxiliary wheel 5 rotatably mounted on the front side of the base 1. The magnetic wheel module 2 includes a drive motor and a magnetic wheel connected to an output shaft of the drive motor. The inner angle crossing auxiliary mechanism includes several transition rollers 4 sequentially rotatably mounted on the base 1, with the distance between the wheel centers of the several transition rollers 4 and the wheel center of the magnetic wheel gradually increasing along a direction from the tail wheel module 3 toward the motion auxiliary wheel 5. The tail wheel module 3 includes a tail wheel motor, a tail wheel swing rod 31, and a tail wheel roller 32. The tail wheel roller 32 is rotatably mounted on the tail wheel swing rod 31, and the tail wheel swing rod 31 is connected to the output shaft of the tail wheel motor. The tail wheel motor is mounted inside the base 1, and the base 1 has an opening that allows the tail wheel roller 32 and the tail wheel swing rod 31 to rotate into. The drive motor and the tail wheel motor are connected to the first battery.

Specifically, the sensing module 6 also includes a depth camera 61. The depth camera 61 and the Hall sensor 62 are mounted on the front side of the base 1. The depth camera 61, the IMU inertial measurement unit, and the Hall sensor 62 are all electrically connected to the first battery.

The working principle or process of this embodiment is as follows:

When the climbing robot moves on a plane, the drive motor drives the magnetic wheel to rotate, while the motion auxiliary wheel 5 and the tail wheel module 3 operate to provide stable support for the climbing robot. When the sensing module 6 detects through the depth camera 61 that the climbing robot is intended to cross an edge-corner structure, the inertial measurement unit and the Hall sensor 62 determine the type of edge-corner structure and whether assistance from the ducted fan 92 is needed. When the climbing robot crosses the edge-corner structure, the inner angle crossing auxiliary mechanism and the tail wheel module 3 determine whether to operate based on the edge-corner structure. The tail wheel module 3 provides stable support for the climbing robot during crossing over a structure such as an outer angle or a steel plate edge. The inner angle crossing auxiliary mechanism enables the climbing robot to gradually detach from a first plane and smoothly cross to the second plane during crossing over an inner angle. When assistance from the ducted fan 92 is needed, the electronic speed controller 93 controls the air duct of the ducted fan 92 to operate, enabling the ducted fan 92 to provide forward or reverse assistance to the climbing robot during the crossing over the edge-corner structure, thus helping the climbing robot to smoothly cross a complex structured edge-corner structure.

The beneficial effects of this embodiment are as follows:

The climbing robot in this solution adopts a wheel-wing dual-drive mode. When it is difficult to precisely control the motion speed of the climbing robot in wheel-drive mode at which it smoothly crosses a complex structured edge-corner structure, the wing-drive of the ducted fan 92 compensates for the shortcomings of the single wheel-drive mode, enhancing the mobility of the climbing robot. This also significantly reduces operational complexity in remotely controlling the climbing robot to cross a challenging edge-corner structure, such that the operator smoothly controls the climbing robot to cross the complex structured edge-corner structure.

The inertial measurement unit can obtain the current motion posture of the climbing robot based on the gravity direction and determine the included angle between the normal vector of the current motion plane of the climbing robot and the gravity direction based on the geometric relationship between the climbing robot and the motion plane. The Hall sensor 62 can determine the magnetic field strength by measuring changes in Hall voltage, and by determining the magnetic field strength, it can be obtained that whether the climbing robot is in an edge-corner structure region and the type of the edge-corner structure region. The electronic speed controller 93 is primarily responsible for controlling the rotation speed of the air duct of the ducted fan 92, thereby controlling the acting force provided by the ducted fan 92 to the climbing robot.

The detachable connection between the ducted fan 92 and the base 1 is achieved through the ducted fan fixing bracket 91, allowing the model of the ducted fan 92 on the base 1 to be changed based on the different requirements of the climbing robot in various working environments. Additionally, when the ducted fan 92 is not needed, the second drive portion 9 can be detached from the base 1, improving the endurance of the climbing robot, flexibility and safety during planar motion, and enabling the climbing robot to gain stronger environmental adaptability and work capability. The ducted fan fixing bracket 91 is arc-shaped to fit the base 1, further increasing the contact area between the ducted fan fixing bracket 91 and the base 1, thus improving the stability of the ducted fan 92 on the base 1. The two independent power supplies prevent excessive use of the ducted fan 92 from causing insufficient power in the climbing robot; otherwise, the climbing robot could lose dynamic and be unable to return to the ground. They also prevent excessive voltage fluctuations in the control system due to excessive motor inductance during acceleration and deceleration of the ducted fan 92, otherwise abnormal operation of the climbing robot could occur.

The magnetic wheel module 2 provides adsorption force and traction capacity for the climbing robot. When the tail wheel module 3 is deployed, it provides stable support for the climbing robot during planar crawling and crossing structures such as outer angles or steel plate edges. When stowed, it is completely housed within the base 1 without contact with the environment. The inner angle crossing auxiliary mechanism enables the climbing robot to cross an inner angle structure, allowing the climbing robot to gradually detach from the first plane and smoothly cross to the second plane. The motion auxiliary wheel 5 can serve, together with the tail wheel module 3, as a support wheel system for the movement of the climbing robot, allowing the climbing robot to move on planes at any angles without the base 1 rolling over and without hindering the climbing robot from crossing various structures. The depth camera 61 can acquire external environment information, enabling the climbing robot to obtain edge-corner structure information and establish a coordinate system to acquire the distance between the edge-corner structure and the climbing robot.

Embodiment 2

This embodiment is a second embodiment of a wheel-wing dual-drive high-mobility climbing robot. This embodiment further defines the process for determining the parameters of the ducted fan 92 based on Embodiment 1.

Figure 3:
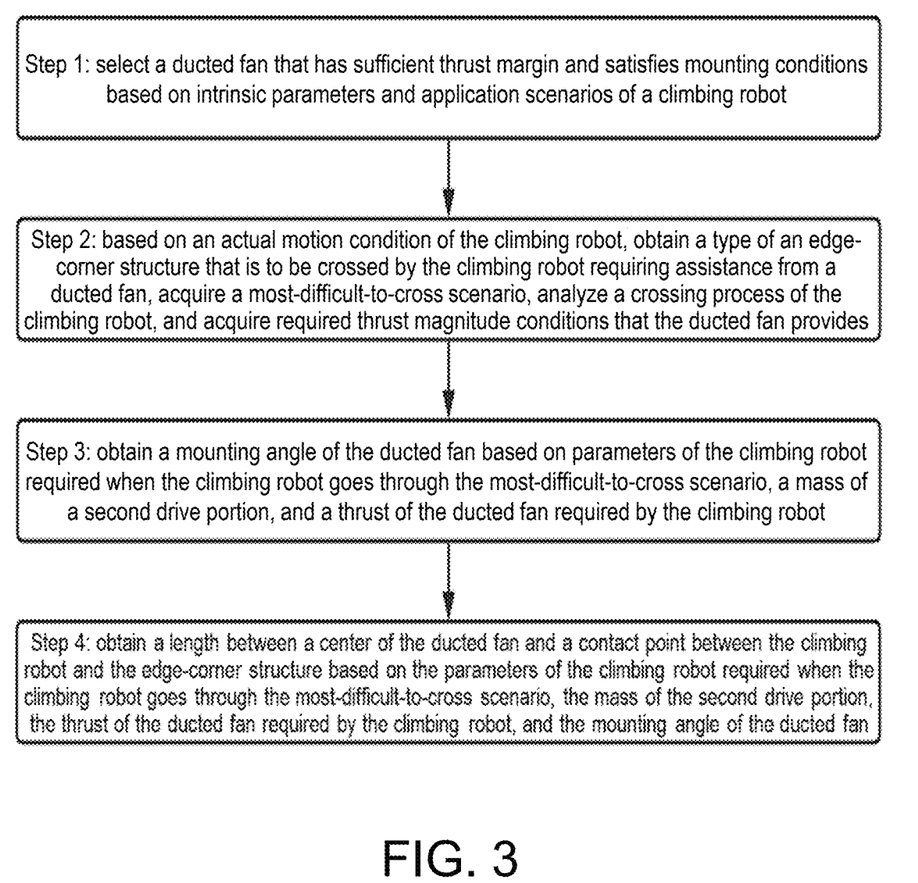
FIG. 3 is a flowchart of steps for determining parameters of the ducted fan of the wheel-wing dual-drive high-mobility climbing robot according to the present invention.

Specifically, as shown in FIG. 3, parameters of the ducted fan 92 are determined according to the following steps:

Step 1: select a ducted fan that has sufficient thrust margin and satisfies mounting conditions based on intrinsic parameters and application scenarios of the climbing robot.

Step 2: based on an actual motion condition of the climbing robot, obtain a type of an edge-corner structure that is to be crossed by the climbing robot requiring assistance from the ducted fan 92, acquire a most-difficult-to-cross scenario, analyze a crossing process of the climbing robot, and acquire required thrust magnitude conditions that the ducted fan 92 provides.

Step 3: obtain a mounting angle θ of the ducted fan 92 based on parameters of the climbing robot required when the climbing robot goes through the most-difficult-to-cross scenario, a mass of the second drive portion 9, and a thrust of the ducted fan 92 required by the climbing robot.

Step 4: obtain a length L between a center of the ducted fan 92 and a contact point between the climbing robot and the edge-corner structure based on the parameters of the climbing robot required when the climbing robot goes through the most-difficult-to-cross scenario, the mass of the second drive portion 9, the thrust of the ducted fan 92 required by the climbing robot, and the mounting angle θ of the ducted fan 92.

Specifically, in step 1, the mounting conditions of the ducted fan include:
  determining a range of a mounting height of the ducted fan 92 on the climbing robot and a maximum volume of the ducted fan 92 based on the intrinsic parameters and the application scenarios of the climbing robot; and
  determining an allowable maximum value of a mass of the second drive portion 9 based on the intrinsic parameters of the climbing robot and a range of a mass center mounting height of the ducted fan 92, where the mass center mounting height of the ducted fan 92 is less than the mounting height of the ducted fan 92 on the climbing robot.

Figure 4:
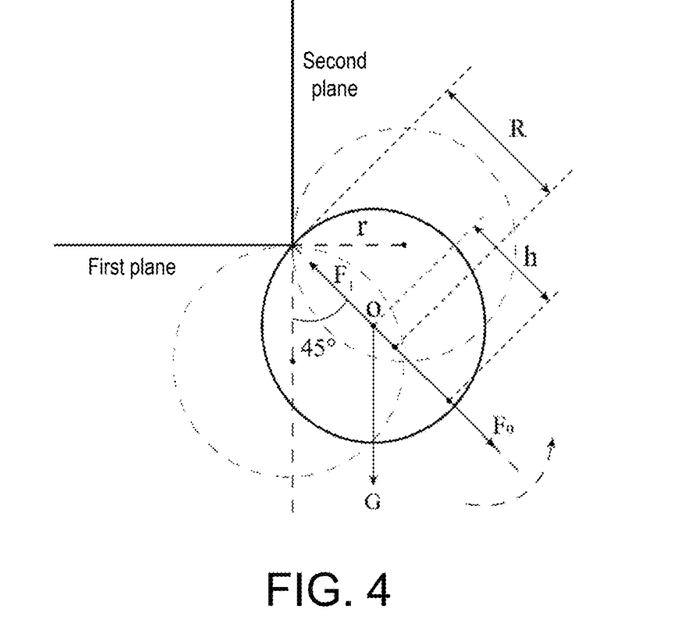
FIG. 4 is a schematic diagram of force analysis of the climbing robot at a sharp angle during crossing over an outer right-angle structure from bottom upwards according to the present invention.

If the climbing robot can smoothly cross the outer right angle and steel plate structure from the bottom surface to the vertical surface, it can smoothly cross other edge-corner structures without the ducted fan 92. As shown in FIG. 4, by analyzing the crossing process of the climbing robot in this scenario, it can be obtained that the relationship between the mass $m_2$ of the second drive portion 9 and the mass center height h of the ducted fan 92 should satisfy the following conditions:

$$R = \frac{r \cdot m_1 + (r+h)m_2}{m}$$

$$m = m_1 + m_2$$

$$F_1 - \frac{\sqrt{2}}{2}(m_1 + m_2)g - \frac{(m_1 + m_2)^2 R \left[V_0^2 - 2gR\left(1 - \frac{\sqrt{2}}{2}\right)\right]}{(m_1 + m_2)R^2 + I} > 0,$$

where R is the overall mass center height of the climbing robot after the ducted fan 92 is mounted; r is a mass center height of the climbing robot before the second drive portion 9 is mounted; h is a mass center height of the ducted fan 92; m is a total mass of the climbing robot; $F_1$ is a radial magnetic force magnitude of the magnetic wheel module 2 when the climbing robot is at 45° during external right-angle crossing; $m_1$ is a mass of the robot; $m_2$ is the mass of the second drive portion 9; and $V_0$ is an initial speed of the climbing robot.

Specifically, in step 2, during the selection of the range of the mass center height of the ducted fan 92 and the maximum volume of the ducted fan 92, collision constraints between the ducted fan 92, the climbing robot body, and the environment should be considered, avoiding collisions between the climbing robot and the environment during operation.

Specifically, in step 2, crossing edge-corner structures requiring assistance from the ducted fan 92 includes the following types: crossing the bottom of vertical and inclined steel plates from top downwards, climbing over horizontal and inclined steel plates from bottom upwards, crossing horizontal steel plates from top downwards, continuously crossing right-angle edges, crossing flange edges upwards from a vertical surface, and crossing other acute angle structures between right angles and steel plates. By analysis, it can be obtained the most-difficult-to-cross scenarios are: crossing the bottom of a vertical steel plate from top downwards, climbing over a horizontal steel plate from bottom upwards, and crossing a horizontal steel plate from top downwards.

Figure 5:
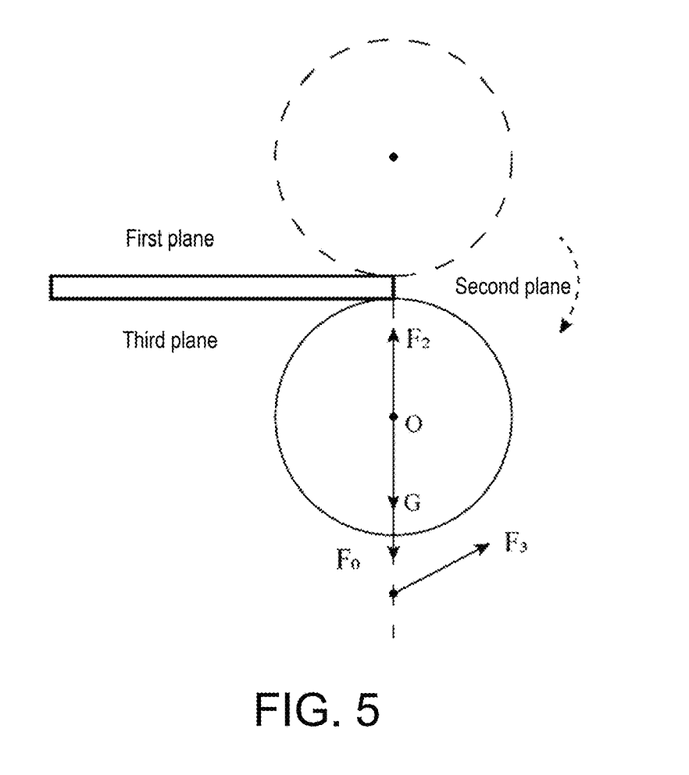
FIG. 5 is a schematic diagram of force analysis of the climbing robot being on a third plane during crossing over a horizontal steel plate structure from top downwards according to the present invention.
Figure 6:
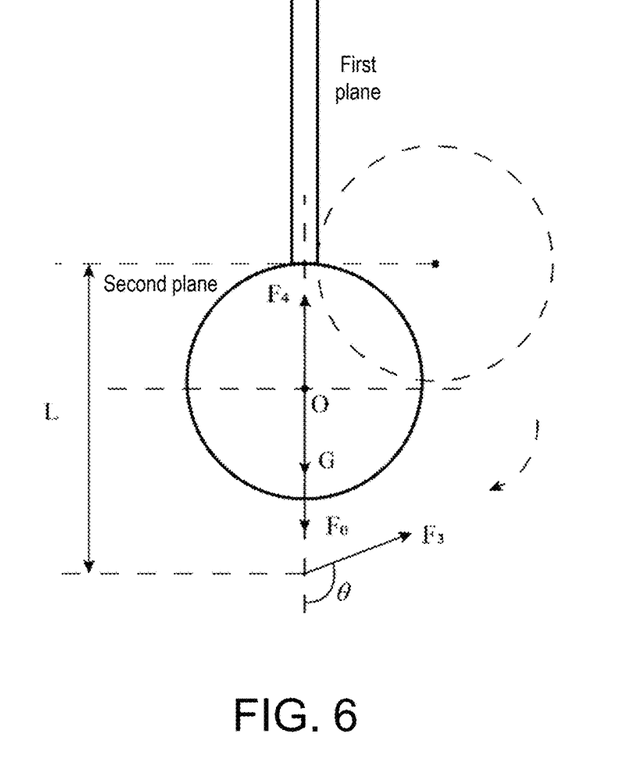
FIG. 6 is a schematic diagram of force analysis of the climbing robot being on a second plane during crossing over a vertical steel plate structure from top downwards according to the present invention.

As shown in FIG. 5, when the climbing robot crosses from top downwards to the bottom of a horizontal steel plate, the force conditions of the climbing robot should satisfy the following:

$$F_2 - mg + F_3 \cdot \cos\theta - \frac{mV_2^2}{R} > 0,$$

where $F_2$ is a magnetic force acting on the climbing robot at the bottom of the horizontal steel plate, $F_3$ is a maximum reverse thrust that is provided by the ducted fan 92 and acts on the climbing robot when the climbing robot crosses the horizontal steel plate and the vertical steel plate from top downwards to bottoms of the horizontal steel plate and the vertical steel plate (i.e., the bottom surface of the horizontal steel plate in the third plane shown in FIG. 5 and the bottom surface of vertical steel plate in the second plane shown in FIG. 6), that is opposite to the motion speed direction of the climbing robot, and $V_2$ is a speed of the climbing robot at the bottoms of the horizontal steel plate and the vertical steel plate.

As shown in FIG. 6, when the climbing robot crosses from top downwards to the bottom of a vertical steel plate, the force conditions of the climbing robot should satisfy the following:

$$F_4 - mg + F_3 \cdot \cos\theta - \frac{mV_2^2}{R} > 0,$$

where $F_4$ is the magnetic force acting on the climbing robot at the bottom of the vertical steel plate.

In addition, to ensure that the climbing robot does not peel off when the reverse thrust speed of the ducted fan 92 acts on the climbing robot at the bottom of the vertical steel plate causing the speed of the climbing robot to drop to 0, the force conditions of the climbing robot should satisfy the following:

$$F_2 + F_3 \cdot \cos\theta - mg > 0.$$

Figure 7:
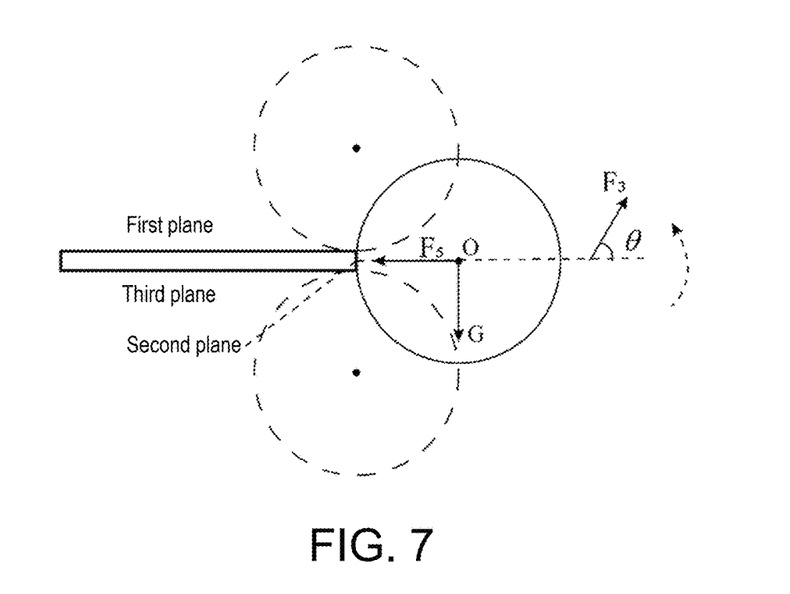
FIG. 7 is a schematic diagram of force analysis of the climbing robot being on the second plane during crossing over a horizontal steel plate structure from bottom upwards according to the present invention.

As shown in FIG. 7, when the climbing robot climbs from bottom upwards over a horizontal steel plate and is located on a side surface of the horizontal steel plate, the climbing robot needs to overcome the maximum gravitational moment. The component force of the forward thrust provided by the ducted fan 92 in the same direction as the motion speed direction of the climbing robot in the radial direction of the magnetic wheel easily causes the climbing robot to peel off. Therefore, the force conditions of the climbing robot satisfy the following:

$$F_5 \cdot \cos\theta < F_2,$$

where $F_5$ is a forward thrust that is provided by the ducted fan 92 for the climbing robot when the climbing robot crosses the horizontal steel plate from bottom upwards to reach the side surface of the horizontal steel plate, and that is in the same direction as the motion direction of the climbing robot.

Specifically, in step 3, by analyzing the force conditions in the most-difficult-to-cross scenario where the climbing robot needs the assistance from the ducted fan 92 to cross an edge-corner structure, it can be obtained the mounting angle θ of the ducted fan 92 should satisfy the following conditions:

$$\begin{cases} \theta = 90°, F_2 > mg \\ \theta = \arccos\left(\dfrac{mg - F_2}{F_3}\right) - \theta_K, F_2 < mg \end{cases},$$

where θ is the mounting angle of the ducted fan 92, that is, an included angle between a central axis of the ducted fan 92 in an XOZ plane of the coordinate system of the climbing robot and a Z-axis; $F_2$ is a magnetic force acting on the climbing robot at a bottom of a horizontal steel plate; $F_3$ is a maximum thrust that is provided by the ducted fan 92 and acts on the climbing robot when the climbing robot crosses the horizontal steel plate and a vertical steel plate from top downwards to reach bottoms of the horizontal steel plate and the vertical steel plate (i.e., the bottom surface of the horizontal steel plate in the third plane shown in FIG. 5 and the bottom surface of vertical steel plate in the second plane shown in FIG. 6), and that is opposite to a motion direction of the climbing robot; m is a total mass of the climbing robot; and OK is a safety margin angle.

Specifically, in step 4, by analyzing the force conditions in the most-difficult-to-cross scenario where the climbing robot needs the ducted fan 92 to cross an edge-corner structure, it can be obtained the height L from the center of the air duct of the ducted fan 92 to the contact point between the climbing robot and the edge-corner structure to be crossed should satisfy the following equations:

$$\begin{cases} F_4 + F_3 \cdot \cos\theta - \dfrac{2m^2gR - F_3 \cdot \sin\theta \cdot \pi \cdot L \cdot m \cdot R}{mR^2 + I} - mg > 0 \\ F_2 + F_3 \cdot \cos\theta - \dfrac{4m^2gR - F_3 \cdot \sin\theta \cdot \pi \cdot L \cdot m \cdot R}{mR^2 + I} - mg > 0, \\ \dfrac{1}{2}\pi \cdot F_5 \sin\theta \cdot L - mgR > 0 \end{cases}$$

where $F_4$ is a magnetic force acting on the climbing robot at a bottom of the vertical steel plate; $F_5$ is a forward thrust that is provided by the ducted fan 92 for the climbing robot when the climbing robot crosses the horizontal steel plate from bottom upwards to reach a side surface of the horizontal steel plate, and that is in a same direction as the motion direction of the climbing robot; L is the mounting height of the ducted fan 92, that is, a length between a center of the ducted fan 92 and a contact point between the climbing robot and the edge-corner structure to be crossed; and I is a rotation inertia of the climbing robot about a Y-axis of the coordinate system.

The beneficial effects of this embodiment are as follows: The climbing robot, after being mounted with the wing-driven ducted fan 92 of which parameters are determined according to the steps in this embodiment, not only reduces the operational difficulty of the operator in scenarios requiring assistance from the ducted fan 92 for crossing, but also does not increase the operational difficulty of the operator in scenarios where the climbing robot crosses without requiring assistance from the ducted fan 92.

Embodiment 3

This embodiment is a third embodiment of a wheel-wing dual-drive high-mobility climbing robot. This embodiment further defines, based on Embodiment 1 and Embodiment 2, the process of the climbing robot crossing an edge-corner structure.

Figure 8:
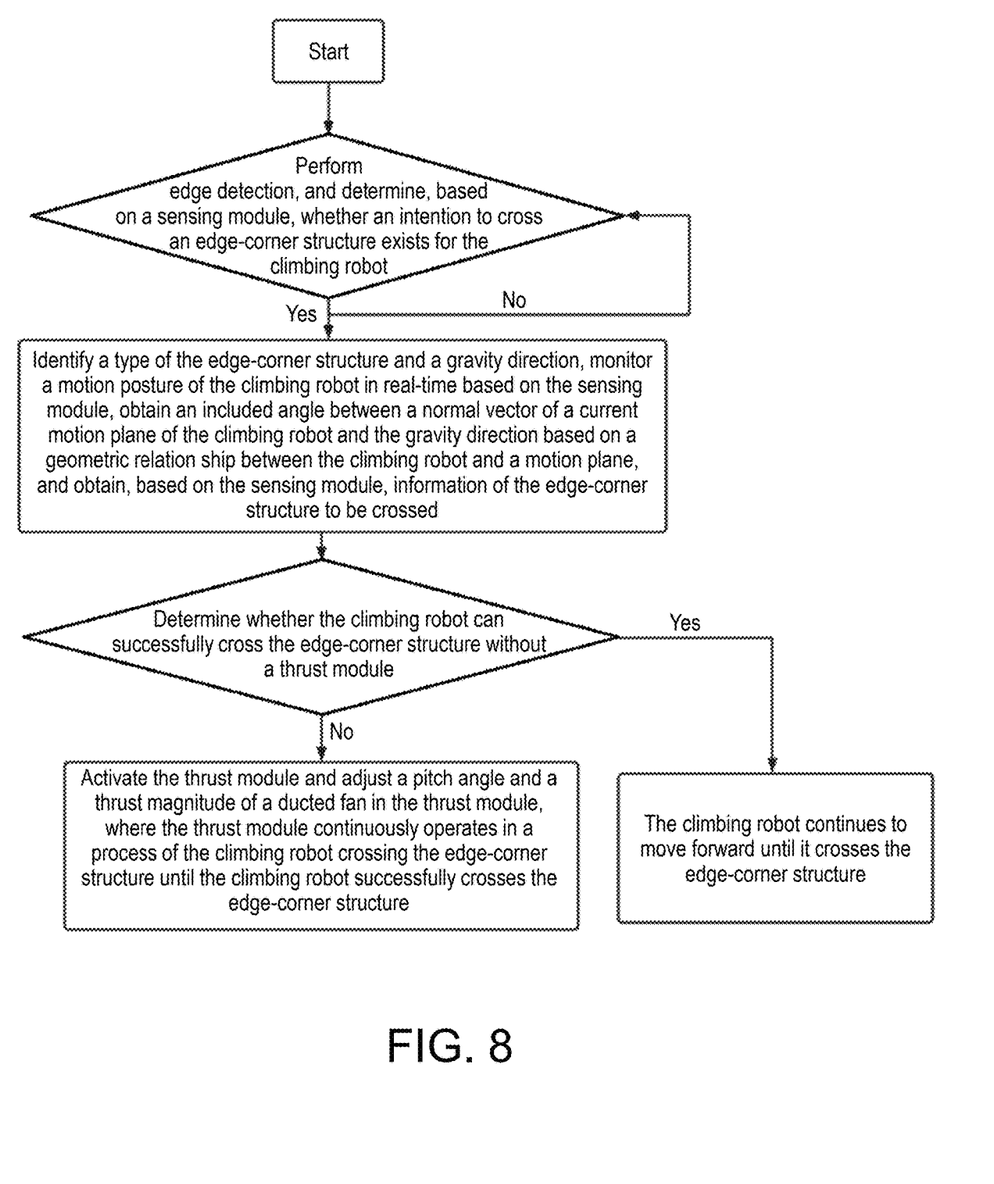
FIG. 8 is a flowchart of the wheel-wing dual-drive high-mobility climbing robot crossing an edge-corner structure according to the present invention.

Specifically, as shown in FIG. 8, the process of the climbing robot crossing the edge-corner structures includes the following steps:

Step 1: perform edge detection; determine, based on the sensing module 6, whether an intention to cross an edge-corner structure exists for the climbing robot, if yes, proceed to step 2, and if no, continue detection.

Step 2: identify the type of the edge-corner structure and the gravity direction, measure a motion posture of the climbing robot in real-time based on the inertial measurement unit in the sensing module 6, obtain an included angle between the normal vector of the current motion plane of the climbing robot and the gravity direction based on the geometric relationship between the climbing robot and the motion plane, and obtain, based on the Hall sensor 52 in the sensing module 6, the information of the edge-corner structure to be crossed.

Step 3: select a crossing strategy; based on the current motion state of the climbing robot and information of the edge-corner structure, calculate whether the climbing robot needs to use the ducted fan 92 to cross the current edge-corner structure, if yes, proceed to step 4, and if no, proceed to step 5.

Step 4: control the thrust of the ducted fan 92, before the climbing robot crosses the edge-corner structure, calculate the required thrust magnitude range of the ducted fan 92 when the climbing robot crosses the edge-corner structure based on the current state of the climbing robot and the information of the edge-corner structure, and during the crossing process of the climbing robot, keep the thrust magnitude of the ducted fan 92 within this range.

Step 5: The climbing robot crosses the edge-corner structure.

Specifically, in step 1, when the sensing module 6 determines whether the intention to cross the edge-corner structure exists for the climbing robot, it first determines the distance between the climbing robot and the edge-corner structure. When the distance between the climbing robot and the edge-corner structure is less than a preset value, it then determines whether the included angle between the forward direction of the climbing robot and the edge line of the edge-corner structure is within a preset range. When the included angle between the climbing robot and the edge line of the edge-corner structure is within the preset range, the climbing robot has the intention to cross the edge-corner structure. The preset range of the included angle between the forward direction of the climbing robot and the edge line of the edge-corner structure is 80° to 100°.

Figure 9:
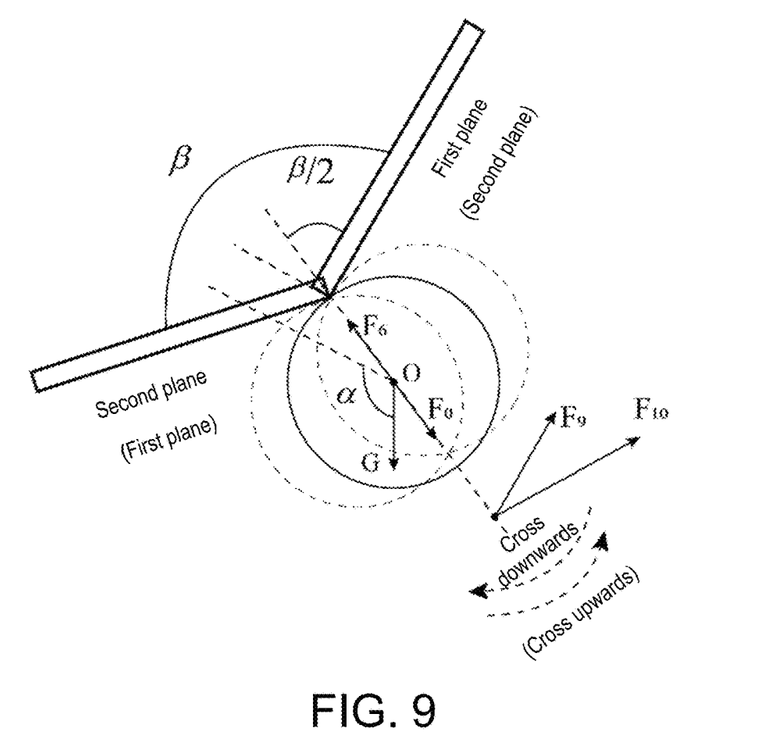
FIG. 9 is a schematic diagram of force analysis of the climbing robot at a sharp angle at a different angle during crossing over an edge-corner structure according to the present invention.
Figure 10:
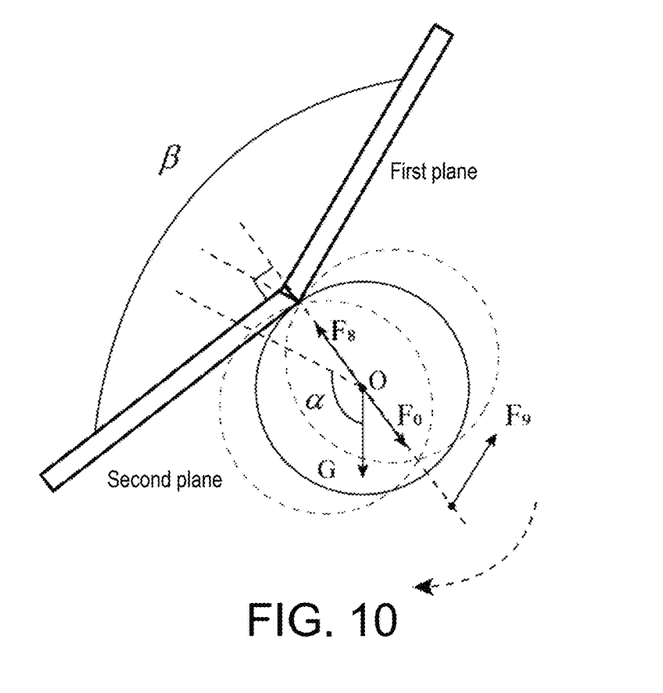
FIG. 10 is a schematic diagram of force analysis of the climbing robot being on the second plane during crossing over an edge-corner structure with a different angle from top downwards according to the present invention.

Specifically, in step 3, the angle of the edge-corner structure that the climbing robot needs to cross during actual crawling varies between 0° and 360°, and the included angle between the motion direction of the climbing robot and the gravity direction also changes. To determine whether the climbing robot needs to use the ducted fan 92 when crossing different edge-corner structures, a unified standard must be established to judge whether the climbing robot can complete the crossing motion without using the ducted fan 92. In the analysis process, two key positions are primarily analyzed: the first one is the sharp angle position of the edge-corner structure where the climbing robot is located during crossing, and as shown in FIG. 9, in this case, the magnetic force on the climbing robot is minimal; the second one is the position on the second plane immediately after the climbing robot completes the crossing motion from top downwards, and as shown in FIG. 10, in this case, the kinetic energy of the climbing robot is maximized and the centrifugal force subjected by the climbing robot is greatest. At these two positions, the climbing robot is most likely to peel off or fail to cross. When the process of the climbing robot crossing edge-corner structures at different included angles is analyzed, the following formulas are used to calculate whether the climbing robot needs to use the ducted fan 92 to cross the current edge-corner structure:

$$\begin{cases} F_6(\beta) - \dfrac{2mgR^2 Vh}{mR^2 + I} + F_7 = F_6(\beta) - \dfrac{2mgR^2\left[\cos\left(\alpha - \pi - \dfrac{\beta}{2}\right) + \cos\left(\pi - \alpha - \dfrac{\pi}{2}\right)\right]}{mR^2 + I} - mg\cdot\cos\left(\alpha - \pi - \dfrac{\beta}{2}\right) > 0, \\ F_8(\beta) - \dfrac{2mgR^2 Vh}{mR^2 + I} + F_7 = F_8(\beta) - \dfrac{2mgR^2\left[\cos\left(\alpha - \dfrac{\pi}{2} - \beta\right) + \cos\left(\pi - \alpha - \dfrac{\pi}{2}\right)\right]}{mR^2 + I} - mg\cdot\cos\left(\alpha - \dfrac{\pi}{2} - \beta\right) > 0 \end{cases}$$

where $F_6$ is a magnetic force acting on the climbing robot at an intermediate position of the edge-corner structure during crossing; $F_7$ is a component force of gravity in a centripetal direction; $F_8$ is a magnetic force acting on the climbing robot located on a second plane immediately after completing crossing motion; Vh is a projection of a distance of a mass center of the climbing robot from an initial position to two key positions in a gravity direction, one key position being the intermediate position of the edge-corner structure where the climbing robot is located during crossing, and the other key position being a position of the second plane where the climbing robot is located immediately after completing the crossing motion; $\alpha$ is an included angle between the second plane and the gravity direction; $\beta$ is an included angle between two planes of the edge-corner structure; R is an overall mass center height of the climbing robot; m is a total mass of the climbing robot; and I is a rotation inertia of the climbing robot about a Y-axis of a coordinate system.

Specifically, in step 4, when it is determined that the ducted fan 92 is to be used for crossing the edge-corner structure, the thrust of the ducted fan 92 needs to be reasonably controlled to keep the kinetic energy of the climbing robot within a reasonable range, preventing the climbing robot from peeling off due to excessive centrifugal force or failing to complete the crossing action due to insufficient centrifugal force. The minimum value of the thrust magnitude range of the ducted fan 92 is the minimum reverse thrust when the climbing robot uses the ducted fan 92 for reverse pushing; and the maximum value of the thrust magnitude range of the ducted fan 92 is the maximum forward thrust when the climbing robot uses the ducted fan 92 for forward pushing, The minimum reverse thrust should satisfy the following conditions:

$$\begin{cases} F_6(\beta) - \dfrac{2mgR^2\left[\cos\left(\alpha - \pi - \dfrac{\beta}{2}\right) + \cos\left(\pi - \alpha - \dfrac{\pi}{2}\right)\right]}{mR^2 + I} - mg \cdot \cos\left(\alpha - \pi - \dfrac{\beta}{2}\right) + \dfrac{F_9 \cdot \sin\theta \cdot \left(\dfrac{\pi - \beta}{2}\right) \cdot L}{R} + F_8 \cdot \cos\theta > 0 \\ F_8(\beta) - \dfrac{2mgR^2\left[\cos\left(\alpha - \dfrac{\pi}{2} - \beta\right) + \cos\left(\pi - \alpha - \dfrac{\pi}{2}\right)\right]}{mR^2 + I} - mg \cdot \cos(\alpha - \pi - \beta) + \dfrac{F_9 \cdot \sin\theta \cdot (\pi - \beta) \cdot L}{R} + F_8 \cdot \cos\theta > 0 \end{cases},$$

where $F_9$ is the minimum reverse thrust of the ducted fan 92; and L is the length from the center of the ducted fan 92 to the contact point between the climbing robot and the edge-corner structure;

The maximum forward thrust should satisfy the following condition:

$$F_8(\beta) - \dfrac{F_{10} \cdot \sin\theta \cdot \dfrac{\pi - \beta}{2} \cdot L}{R} - \dfrac{2mgR^2\left[\cos\left(\alpha - \dfrac{\pi}{2} - \beta\right) + \cos\left(\pi - \alpha - \dfrac{\pi}{2}\right)\right]}{mR^2 + I} - mg \cdot \cos\left(\alpha - \dfrac{\pi}{2} - \beta\right) - F_{10} \cdot \cos\theta > 0,$$

where $F_{10}$ is the maximum forward thrust of the ducted fan 92.

Specifically, in step 5, if the climbing robot has a trend of peeling off during the crossing over the edge-corner structure, the climbing robot can adjust the forward and reverse thrust of the ducted fan 92 to keep its travel speed within a safe range, preventing the climbing robot from peeling off the working surface and falling, which could damage the climbing robot body.

The beneficial effects of this embodiment are as follows:

According to the climbing robot control method in this embodiment, during the motion process of crossing edge-corner structures, the motion state of the climbing robot is analyzed. When the climbing robot is at risk of peeling off or unable to complete the crossing action, the motion state of the climbing robot can be adjusted through forward or reverse thrust from the ducted fan 92 module, enabling the climbing robot to smoothly and safely complete the crossing motion.

In the specific content of the above implementations, the technical features can be combined in any non-contradictory manner. To keep the description concise, not all possible combinations of the above technical features have been described. However, as long as there is no contradiction in the combination of these technical features, they should be considered within the scope recorded in this specification.

Obviously, the above embodiments of the present invention are merely examples to clearly illustrate the present invention and are not intended to limit the implementations of the present invention. For those of ordinary skill in the art, other different forms of changes or modifications can be made based on the above description. It is neither necessary nor possible to exhaustively list all implementations here. Any modifications, equivalent substitutions, improvements, and the like made within the spirit and principles of the present invention should be included within the protection scope of the claims of the present invention.

What is claimed is:

1. A wheel-wing dual-drive high-mobility climbing robot, comprising a base (1), a first drive portion, a second drive portion (9), an inertial measurement unit, a Hall sensor (62), a depth camera (61), and a control module (7), wherein the first drive portion comprises magnetic wheel modules (2) rotatably mounted on two sides of the base (1);

the second drive portion comprises a ducted fan (92) mounted on the base (1) and an electronic speed controller (93) capable of controlling a rotation speed and a rotation direction of the ducted fan (92);

the inertial measurement unit is configured to acquire current motion state information of the climbing robot and an included angle between a normal vector of a current motion plane of the climbing robot and a gravity direction, the motion state information comprising a motion direction of the climbing robot and a motion angular speed of the climbing robot during crossing over an edge-corner structure;

the depth camera (61) is configured to acquire external environment information, determine whether an edge-corner structure exists, and to acquire pose information of the edge-corner structure in combination with data from the inertial measurement unit;

the Hall sensor (62) is configured to acquire type information of the edge-corner structure;

the control module (7) is configured to determine, based on the pose information of the edge-corner structure, pose information of the climbing robot, and the motion state information of the climbing robot, whether a trend to cross the edge-corner structure exists for the climbing robot, and select a crossing strategy based on the type information of the edge-corner structure when the trend to cross the edge-corner structure exists; and the crossing strategy comprises a first crossing strategy and a second crossing strategy, the first crossing strategy comprises letting the first drive portion be in operation and letting the second drive portion be not in operation, the second crossing strategy comprises letting the first drive portion and the second drive portion be in operation simultaneously, and during execution of the second crossing strategy, the control module (7) controls the rotation speed and the rotation direction of the ducted fan (92) via the electronic speed controller.

2. The wheel-wing dual-drive high-mobility climbing robot according to claim 1, wherein the second drive portion (9) further comprises a ducted fan fixing bracket (91), the ducted fan fixing bracket (91) is detachably mounted on a top of the base (1), the ducted fan (92) is fixedly connected to the ducted fan fixing bracket (91), and the electronic speed controller (93) is mounted on the base.

3. The wheel-wing dual-drive high-mobility climbing robot according to claim 1, wherein the control module (7) determines whether the trend to cross the edge-corner structure exists for the climbing robot according to following steps:

determining whether a distance between the climbing robot and an edge line of the edge-corner structure is less than a preset value; if the distance is not less than the preset value, continuing detection; if the distance is less than the preset value, determining whether an included angle between a current motion direction of the climbing robot and the edge line of the edge-corner structure is in a preset range; if the included angle is not in the preset range, continuing detection; and if the included angle is in the preset range, determining the trend to cross the edge-corner structure exists.

4. The wheel-wing dual-drive high-mobility climbing robot according to claim 1, wherein when the control module (7) selects the crossing strategy, the control module (7) selects the crossing strategy based on following conditions:

$$\begin{cases} F_6(\beta) - \dfrac{2mgR^2 Vh}{mR^2+I} + F_7 = F_6(\beta) - \dfrac{2mgR^2\left[\cos\left(\alpha-\pi-\dfrac{\beta}{2}\right)+\cos\left(\pi-\alpha-\dfrac{\pi}{2}\right)\right]}{mR^2+I} - mg\cdot\cos\left(\alpha-\pi-\dfrac{\beta}{2}\right) > 0 \\ F_8(\beta) - \dfrac{2mgR^2 Vh}{mR^2+I} + F_7 = F_8(\beta) - \dfrac{2mgR^2\left[\cos\left(\alpha-\dfrac{\pi}{2}-\beta\right)+\cos\left(\pi-\alpha-\dfrac{\pi}{2}\right)\right]}{mR^2+I} - mg\cdot\cos\left(\alpha-\dfrac{\pi}{2}-\beta\right) > 0 \end{cases}$$

wherein $F_6$ is a magnetic force acting on the climbing robot at an intermediate position of the edge-corner structure during crossing; $F_7$ is a component force of gravity in a centripetal direction; $F_8$ is a magnetic force acting on the climbing robot located on a second plane immediately after completing crossing motion; Vh is a projection of a distance of a mass center of the climbing robot from an initial position to two key positions in a gravity direction, one key position being the intermediate position of the edge-corner structure where the climbing robot is located during crossing, and the other key position being a position of the second plane where the climbing robot is located immediately after completing the crossing motion; $\alpha$ is an included angle between the second plane and the gravity direction; $\beta$ is an included angle between two planes of the edge-corner structure; R is an overall mass center height of the climbing robot; m is a total mass of the climbing robot; and I is a rotation inertia of the climbing robot about a Y-axis of a coordinate system; and the first crossing strategy is selected if the above conditions are satisfied; the second crossing strategy is selected if the above conditions are not satisfied.

5. The wheel-wing dual-drive high-mobility climbing robot according to claim 1, wherein during execution of the second crossing strategy, a minimum thrust value of the ducted fan (92) is a minimum reverse thrust required when the climbing robot uses the ducted fan (92) for reverse pushing; and a maximum thrust value of the ducted fan (92) is a maximum forward thrust obtained when the climbing robot uses the ducted fan (92) for forward pushing, wherein the minimum reverse thrust required when the climbing robot uses the ducted fan (92) for reverse pushing should satisfy following conditions:

$$\begin{cases} F_6(\beta) - \dfrac{2mgR^2\left[\cos\left(\alpha-\pi-\dfrac{\beta}{2}\right)+\cos\left(\pi-\alpha-\dfrac{\pi}{2}\right)\right]}{mR^2+I} - mg\cdot\cos\left(\alpha-\pi-\dfrac{\beta}{2}\right) + \dfrac{F_9\cdot\sin\theta\cdot\left(\dfrac{\pi-\beta}{2}\right)\cdot L}{R} + F_8\cdot\cos\theta > 0 \\ F_8(\beta) - \dfrac{2mgR^2\left[\cos\left(\alpha-\dfrac{\pi}{2}-\beta\right)+\cos\left(\pi-\alpha-\dfrac{\pi}{2}\right)\right]}{mR^2+I} - mg\cdot\cos(\alpha-\pi-\beta) + \dfrac{F_9\cdot\sin\theta\cdot(\pi-\beta)\cdot L}{R} + F_8\cdot\cos\theta > 0 \end{cases}$$

wherein $F_6$ is a magnetic force acting on the climbing robot at an intermediate position of the edge-corner structure during crossing; $F_8$ is a magnetic force acting on the climbing robot located on a second plane immediately after completing crossing motion; $F_9$ is the minimum reverse thrust of the ducted fan (92); R is an overall mass center height of the climbing robot; m is a total mass of the climbing robot; $\theta$ is an included angle between a central axis of the ducted fan (92) in an XOZ plane of a coordinate system of the climbing robot and a Z-axis; $\alpha$ is an included angle between the second plane and a gravity direction; $\beta$ is an included angle between two planes of the edge-corner structure; I is a rotation inertia of the climbing robot about a Y-axis of the coordinate system; and L is a length between a center of the ducted fan (92) and a contact point between the climbing robot and the edge-corner structure; and the maximum forward thrust required when the climbing robot uses the ducted fan (92) for forward pushing should satisfy following conditions:

$$F_8(\beta) - \dfrac{F_{10}\cdot\sin\theta\cdot\dfrac{\pi-\beta}{2}\cdot L}{R} - \dfrac{2mgR^2\left[\cos\left(\alpha-\dfrac{\pi}{2}-\beta\right)+\cos\left(\pi-\alpha-\dfrac{\pi}{2}\right)\right]}{mR^2+I} - mg\cdot\cos\left(\alpha-\dfrac{\pi}{2}-\beta\right) - F_{10}\cdot\cos\theta > 0,$$

wherein $F_{10}$ is the maximum forward thrust of the ducted fan (92).

6. The wheel-wing dual-drive high-mobility climbing robot according to claim 2, wherein parameters of the ducted fan (92) are determined according to following steps:

step 1: selecting a ducted fan that has sufficient thrust margin and satisfies mounting conditions based on intrinsic parameters and application scenarios of the climbing robot;

step 2: based on an actual motion condition of the climbing robot, obtaining a type of an edge-corner structure that is to be crossed by the climbing robot requiring assistance from the ducted fan (92), acquiring a most-difficult-to-cross scenario, analyzing a crossing process of the climbing robot, and acquiring required thrust magnitude conditions that the ducted fan (92) provides;

step 3: obtaining a mounting angle θ of the ducted fan (92) based on parameters of the climbing robot required when the climbing robot goes through the most-difficult-to-cross scenario, a mass of the second drive portion (9), and a thrust of the ducted fan (92) required by the climbing robot; and step 4: obtaining a length L between a center of the ducted fan (92) and a contact point between the climbing robot and the edge-corner structure based on the parameters of the climbing robot required when the climbing robot goes through the most-difficult-to-cross scenario, the mass of the second drive portion (9), the thrust of the ducted fan (92) required by the climbing robot, and the mounting angle θ of the ducted fan (92).

7. The wheel-wing dual-drive high-mobility climbing robot according to claim 6, wherein in step 1, the mounting conditions of the ducted fan comprise:

determining a range of a mounting height of the ducted fan (92) on the climbing robot and a maximum volume of the ducted fan (92) based on the intrinsic parameters and the application scenarios of the climbing robot; and determining an allowable maximum value of a mass of the second drive portion (9) based on the intrinsic parameters of the climbing robot and a range of a mass center mounting height of the ducted fan (92), wherein the mass center mounting height of the ducted fan (92) is less than the mounting height of the ducted fan (92) on the climbing robot.

8. The wheel-wing dual-drive high-mobility climbing robot according to claim 7, wherein a relationship between the mass m of the second drive portion (9) and an overall mass center height R of the climbing robot after the ducted fan (92) is mounted should satisfy following conditions:

$$R = \frac{r \cdot m_1 + (r+h)m_2}{m}$$

$$m = m_1 + m_2$$

$$F_1 - \frac{\sqrt{2}}{2}(m_1 + m_2)g - \frac{(m_1 + m_2)^2 R\left[V_0^2 - 2gR\left(1 - \frac{\sqrt{2}}{2}\right)\right]}{(m_1 + m_2)R^2 + I} > 0$$

wherein R is the overall mass center height of the climbing robot after the ducted fan (92) is mounted; r is a mass center height of the climbing robot before the second drive portion (9) is mounted; h is a mass center height of the ducted fan (92); m is a total mass of the climbing robot; $F_1$ is a radial magnetic force magnitude of the magnetic wheel module (2) when the climbing robot is at 45° during external right-angle crossing, $m_1$ is a mass of the robot; $m_2$ is a mass of the second drive portion (9); $V_0$ is an initial speed of the climbing robot; and I is a rotation inertia of the climbing robot about a Y-axis of a coordinate system.

9. The wheel-wing dual-drive high-mobility climbing robot according to claim 6, wherein in step 3, the mounting angle θ of the ducted fan (92) should satisfy following conditions:

$$\begin{cases} \theta = 90°, F_2 > mg \\ \theta = \arccos\left(\frac{mg - F_2}{F_3}\right) - \theta_K, F_2 < mg \end{cases}$$

wherein θ is the mounting angle of the ducted fan (92), that is, an included angle between a central axis of the ducted fan (92) in an XOZ plane of the coordinate system of the climbing robot and a Z-axis; $F_2$ is a magnetic force acting on the climbing robot at a bottom of a horizontal steel plate; $F_3$ is a maximum thrust that is provided by the ducted fan (92) and acts on the climbing robot when the climbing robot crosses the horizontal steel plate and a vertical steel plate from top downwards to reach bottoms, and that is opposite to a motion direction of the climbing robot; m is a total mass of the climbing robot; and Ox is a safety margin angle.

10. The wheel-wing dual-drive high-mobility climbing robot according to claim 6, wherein in step 4, a mounting height L of the ducted fan (92) should satisfy following equations:

$$\begin{cases} F_4 + F_3 \cdot \cos\theta - \frac{2m^2 gR - F_3 \cdot \sin\theta \cdot \pi \cdot L \cdot m \cdot R}{mR^2 + I} - mg > 0 \\ F_2 + F_3 \cdot \cos\theta - \frac{4m^2 gR - F_3 \cdot \sin\theta \cdot \pi \cdot L \cdot m \cdot R}{mR^2 + I} - mg > 0 \\ \frac{1}{2}\pi \cdot F_5 \sin\theta \cdot L - mgR > 0 \end{cases}$$

wherein $F_2$ is a magnetic force acting on the climbing robot at a bottom of a horizontal steel plate; $F_3$ is a maximum thrust that is provided by the ducted fan (92) and acts on the climbing robot when the climbing robot crosses the horizontal steel plate and a vertical steel plate from top downwards to reach bottoms, and that is opposite to a motion direction of the climbing robot; and $F_4$ is a magnetic force acting on the climbing robot at a bottom of the vertical steel plate; $F_5$ is a forward thrust that is provided by the ducted fan (92) and acts on the climbing robot when the climbing robot crosses the horizontal steel plate from bottom upwards to reach a side surface of the horizontal steel plate, and that is in a same direction as the motion direction of the climbing robot; R is an overall mass center height of the climbing robot after the ducted fan (92) is mounted; m is a total mass of the climbing robot; L is the mounting height of the ducted fan (92), that is, a length between a center of the ducted fan (92) and a contact point between the climbing robot and the edge-corner structure to be crossed; and I is a rotation inertia of the climbing robot about a Y-axis of the coordinate system.

* * * * *